United States Patent
Into

(10) Patent No.: US 6,532,310 B1
(45) Date of Patent: Mar. 11, 2003

(54) REMOVING NOISE CAUSED BY ARTIFACTS FROM A DIGITAL IMAGE SIGNAL

(75) Inventor: Stephen W. Into, Harvard, MA (US)

(73) Assignee: Schlumberger Technologies Inc., San Jose, CA (US)

(*) Notice: Subject to any disclaimer, the term of this patent is extended or adjusted under 35 U.S.C. 154(b) by 0 days.

(21) Appl. No.: 09/957,870

(22) Filed: Sep. 21, 2001

Related U.S. Application Data

(63) Continuation of application No. 09/186,494, filed on Nov. 4, 1998, now Pat. No. 6,295,384.

(51) Int. Cl.[7] .................................................. G06K 9/44
(52) U.S. Cl. ....................................... 382/275; 382/199
(58) Field of Search ................................ 382/275, 199, 382/266–269

(56) References Cited

U.S. PATENT DOCUMENTS

| | | | | |
|---|---|---|---|---|
| 4,853,795 A | * | 8/1989 | Morton et al. .............. 358/447 |
| 5,046,114 A | * | 9/1991 | Zobel ............................ 382/9 |
| 5,074,306 A | * | 12/1991 | Green et al. ................. 600/317 |
| 5,179,419 A | * | 1/1993 | Palmquist et al. ......... 356/237.2 |
| 5,351,305 A | * | 9/1994 | Wood et al. ................. 382/128 |
| 5,644,386 A | * | 7/1997 | Jenkins et al. ............. 356/4.01 |
| 5,841,477 A | * | 11/1998 | Kim ............................ 348/466 |
| 5,926,564 A | * | 7/1999 | Kimura ....................... 382/170 |
| 6,095,989 A | * | 8/2000 | Hay et al. ................... 600/558 |
| 6,141,460 A | * | 10/2000 | Amer et al. ................. 382/199 |

* cited by examiner

Primary Examiner—Thomas D. Lee
Assistant Examiner—Stephen Brinich
(74) Attorney, Agent, or Firm—Cohen, Pontani, Lieberman & Pavane

(57) ABSTRACT

Noise in digitized image data is reduced by providing an array of pixels for each of which a gray level has been determined. For each column of the array, a distribution of gray levels is derived, and a range of acceptable gray levels is set based on the distribution. For pixels with a gray level outside the range, the gray level is changed to reduce the influence of noise in the imaged data.

28 Claims, 5 Drawing Sheets

REMOVING NOISE CAUSED BY ARTIFACTS FROM A DIGITAL IMAGE SIGNAL

This application is a continuation of application Ser. No. 09/186,494 filed Nov. 4, 1998 now U.S. Pat. No. 6,295,384.

FIELD OF THE INVENTION

The invention is directed to improving the output obtained from an imaging system and, in particular, to a technique which processes a digitized image of an object to remove noise.

BACKGROUND OF THE INVENTION

Imaging systems are used in such fields as microelectronics, medicine, biology, genetic engineering, mapping and even astronomy. The imaging device can be a suitable type of microscope or, in the case of astronomy, a telescope. The demand for image accuracy is high and, therefore, the influence of noise in a signal derived from an imaged object must be minimized.

For reasons of convenience and efficiency, the invention will be described in the microelectronics environment, although another environment could also have been chosen. During the manufacture of very large scale integration (VLSI) semiconductor devices, measurements are made at several stages of the manufacturing process to determine whether particular features on the object are within specified design tolerances. If not, then suitable corrective action is taken quickly.

As is well known, such a manufacturing process produces a wafer which is divided into dies. Each die has a large number of electronic components. These components are defined by what can generally be termed "features" in the sense that a feature is detectable by a microscope as a foreground element distinguishable from a background, or vice versa, and having a dimension such as width. To measure that width the edges of the feature must be located accurately. "Edge" is a term used to signify detectable discontinuities in a signal obtained by imaging the feature (in any environment, not only microelectronics). The goal of edge detection is to accurately locate the transitions despite the influence of blurring and the presence of noise.

As technology has succeeded to increase the component density per die, the feature dimensions have shrunk to significantly below a micrometer. Consequently, the measurement equipment must measure submicrometer dimensions with lower allowable error tolerances.

Automated systems have been developed for making these measurements to replace manual systems in order to obtain higher process yields, to reduce exposure of the wafers to contamination and to provide a higher throughput. One example of an automated system is disclosed in U.S. Pat. No. 4,938,600. As shown in FIG. 1 which is taken from that patent, an image of a feature is recorded through a microscope and the recorded image is then processed electronically to obtain the required measurements. One such automated system is the Model IVS-120 metrology system manufactured by Schlumberger Verification Systems of Concord, Mass., a division of Schlumberger ATE Products. The major elements of the system, including a wafer handler, an optical system and a computer system, are mounted in a cabinet (not shown).

The wafer handler includes a cassette wafer holder 12 which contains wafers to be measured, a prealigner 14, a wafer transport pick mechanism (not shown) for moving the wafers and a measurement stage 18 which holds the wafers during the actual measurement operation. During operation, the wafer transport pick mechanism removes a wafer 16 from cassette 12 and places it on prealigner 14. Prealigner 14 then rotates wafer 16 to a predetermined orientation by sensing a mark, a flat spot or notched edge on wafer 16, after which the wafer transport pick mechanism transfers wafer 16 from prealigner 14 to measurement stage 18 and positions wafer 16 in a horizontal orientation. Stage 18 is movable in three dimensions for precisely positioning wafer 16 relative to the optical system for performing the actual measurement.

The optical system includes microscope 20 and video camera 22 positioned above the measurement stage 18 and wafer 16. Microscope 20 typically has a turret carrying several objective lenses providing a desired range of magnification and is mounted so that microscope 20 and camera 22 have a vertical optical axis which is perpendicular to the wafer surface.

A feature to be measured on wafer 16 is located with microscope 20 in a well known manner by moving stage 18 until the feature is in the field of view of the objective lens. The optical system is focused, and a focused image of the feature is digitized and recorded by the camera 22. The image is then stored or "frozen".

The system is controlled by a computer 30. Coupled to the computer 30 are a monitor 32 for display of the image recorded by the camera 22 and text, and a keyboard 36 (which constitute an input terminal for entering operator commands) and a disk drive 38 for storing system software and data.

Image processor 28 uses software algorithms to locate the edges of the selected feature and make a measurement. Computer 30 then displays the measurement data on screen 32, prints a hard copy or transfers the data directly to a host computer (not shown) for centralized data analysis. Once the process is complete, wafer 16 is returned to cassette 12 by the wafer handler.

The just-described system performs its task of edge detection very well. Image processor 28 determines where a discontinuity occurs in the gray level of the digitized image. Such a discontinuity can occur for any one of many well known reasons to create an edge of a feature. For example, an edge can occur where two materials meet which have different gray levels, or due to topology of the imaged surface. However, as is well known, the digitized image is subject to spurious noise from various sources. For example, variations in the gray level due to noise can be caused by surface imperfections on the die, such as spots and cracks. This noise in the imaged signal can have a significant distorting influence on the accuracy with which the edge is detected, particularly with the ever increasing precision which such automated measurement systems must provide. (Of course, in environments other than microelectronics, there are analogous causes of noise.)

Certain approaches are known which aim to eliminate the noise created by these imperfections and thereby improve the signal-to-noise ratio (S/N). For example, smoothing filters are commonly used for noise reduction. However, as explained in *Digital Image Processing* by Gonzales and Woods, Addison-Wesley Publishing Co. 1993 at page 191, a smoothing filter blurs edges because it relies on neighborhood averaging which averages all the pixels in an area of selected size around a pixel of interest. Such a blurring of the edge cannot be tolerated in a measurement system which must locate the edge precisely. For such an application, the authors recommend an alternative approach which uses median filters. This approach replaces the gray level of each pixel by the median of the gray levels in a neighborhood of that pixel, instead of by the average. This method is particularly effective to preserve edge sharpness when the noise pattern includes strong, spike-like components. However, even median filtering is not satisfactory for the type of precision measurements discussed above because when the filter parameters are set to provide filtering, the edge gets modified, and when the parameters are set to preserve the edge, the filtering effect is reduced or even eliminated.

SUMMARY OF THE INVENTION

One object of the present invention is to remove the influence of noise in a signal obtained with an imaging system.

A further object of the present invention is to improve the S/N ratio of the output signal received from the imaging device in such system.

Another object of the present invention is to enable improved accuracy for a high precision measurement system which uses an imaging device.

Yet another object of the present invention is to enable improved accuracy of edge detection with an imaging system despite the presence of noise in the image signal.

These and other objects are attained in accordance with one aspect of the present invention for reducing noise in a signal obtained by imaging an object with an imaging device. Digitized image data is provided corresponding to an area of the object and having values of an imaging parameter for an array of m×n pixels. For each of columns n in the array, a distribution of the number of pixels vs. imaging parameter level is derived. Based on the distribution, a range of acceptable values of imaging parameter levels is set. For all values of imaging parameter levels outside of the range, characteristics of the pixels associated with such values are changed.

DETAILED DESCRIPTION OF A PREFERRED EMBODIMENT OF THE INVENTION

Figure 2:
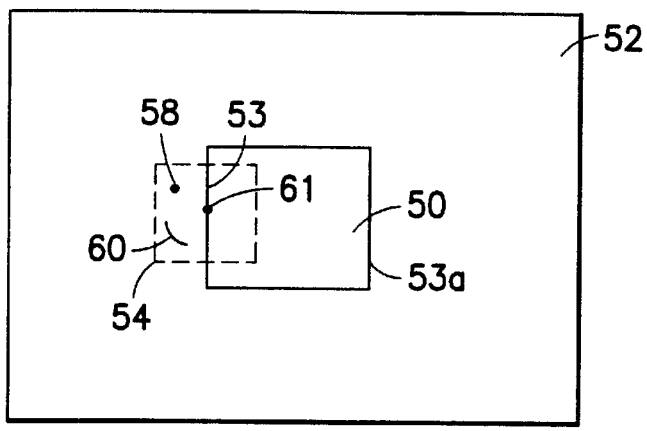
FIG. 2 is a schematic representation of an object with a rectangular-shaped feature in the environment of microelectronics, a dimension of which is to be measured.

FIG. 2 illustrates a feature 50 on a surface 52 which constitutes a part of a sample, or object, being measured. Camera 22 utilizes a 16 bit gray level signal to digitize the image from the microscope, thus providing a commensurate number of possible gray levels. For the sake of illustration, feature 50 and surface 52 are presumed to have respective gray levels of 100 (relatively dark) and 200 (relatively light). If the width of feature 50 is to be measured, it can be determined as the distance between its edges 53 and 53a. In order to locate the edge 53, i.e., the discontinuity from 200 to 100, a region of interest 54 is set by the operator to encompass the edge. The size of the region of interest, in terms of pixels, is set by the operator based on certain criteria. For example, these criteria include the size of the feature, providing sufficient extra area to ensure capture of the feature, and obtaining sufficient data to perform the required processing fully and properly. It is possible that several regions of interest 54 will be spaced along the entire length of edge 53 for various reasons, as explained below.

The edge 53 is visible to the operator on image monitor 32 (FIG. 1) by applying a prior art approach such as is available on the IVS-120. Thus, the position of edge 53 at this point is subject to the inaccuracy of such approach due to noise, as discussed above, but it has sufficient accuracy to enable the operator to set the region of interest 54 so that the present invention can be applied, as explained below.

Figure 1:
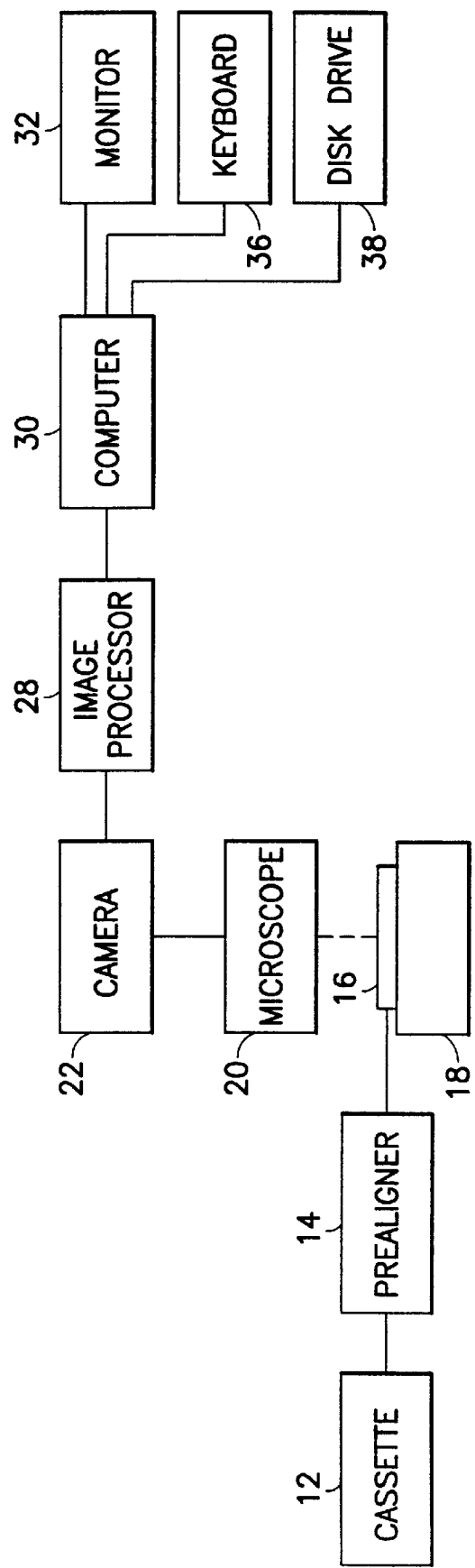
FIG. 1 is a block diagram of a prior art automated measurement system for providing optical measurements of a semiconductor device.
Figure 7:
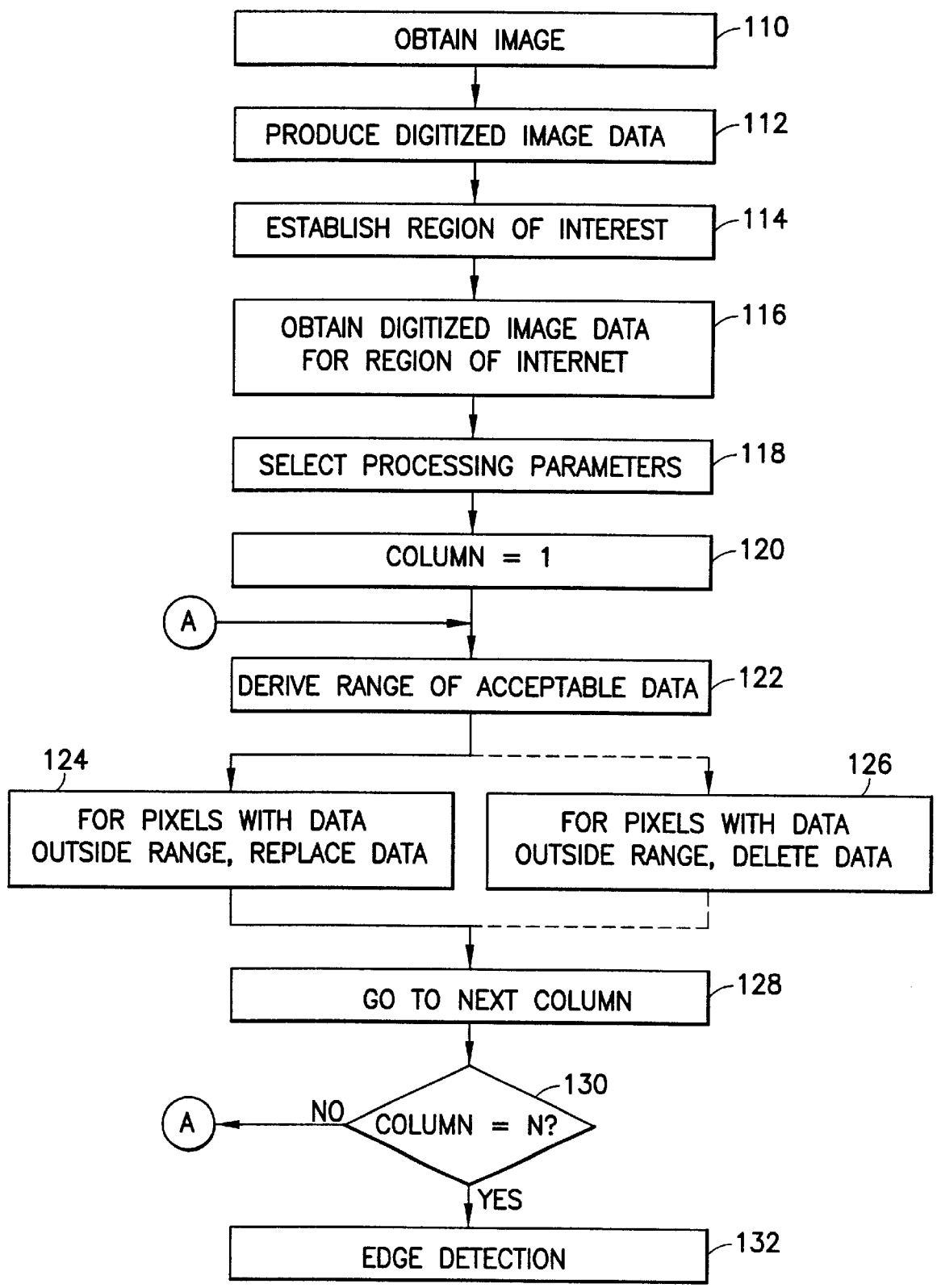
FIG. 7 is a flowchart of the steps performed in accordance with the invention to detect an edge.

Feature 50 and its surroundings on surface 52 are imaged by the imaging device, such as by microscope 20 in FIG. 1, and in accordance with step 110 in FIG. 7. The resulting output is digitized, such as by camera 22 in FIG. 1, and in accordance with step 112 in FIG. 7. In step 114 the operator establishes the region of interest, as explained above, and the digitized data therefor is obtained in step 116.

Figure 3:
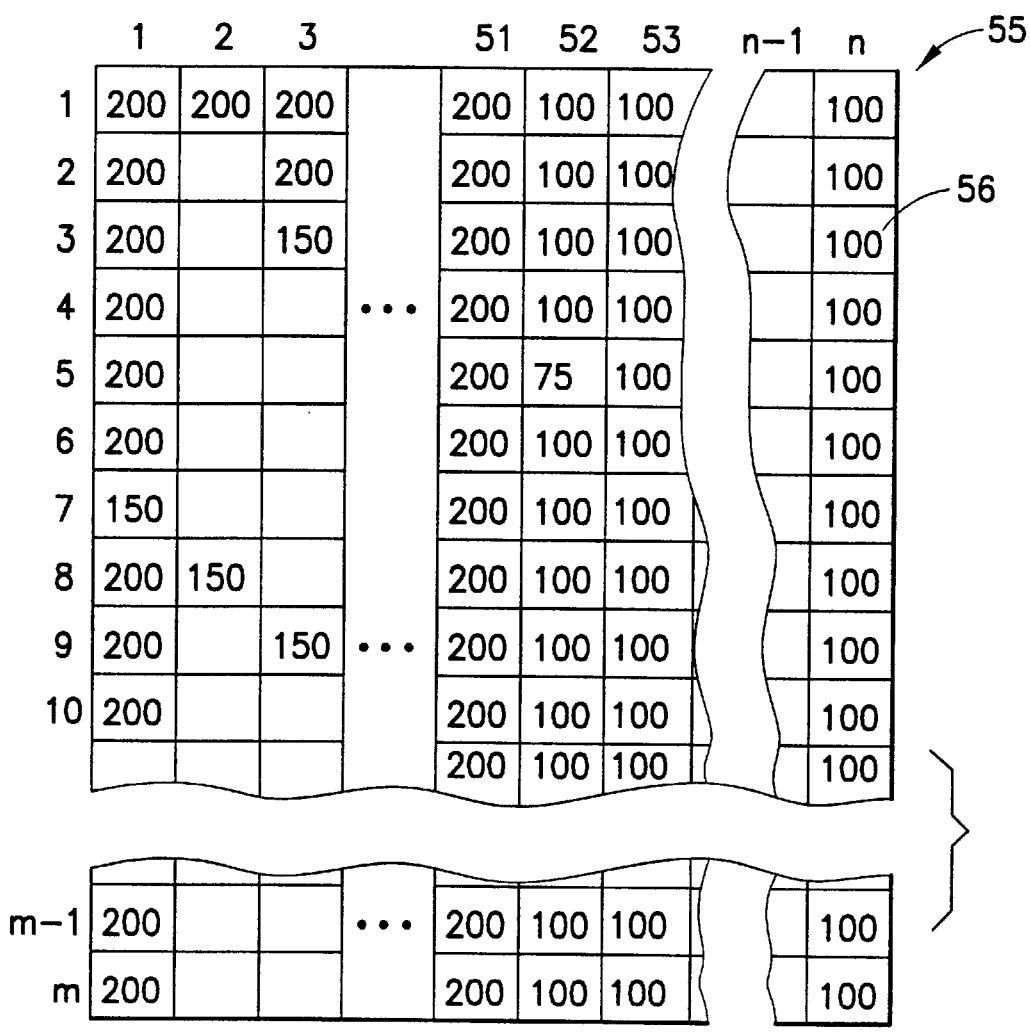
FIG. 3 is a table of pixel gray levels produced from imaging the feature of FIG. 2.

FIG. 3 shows a depiction of the area of interest 54 as a row and column array 55 of m×n pixels 56. Moreover, the array 55 is also shown with the digitized image data of the gray level value for each pixel which is obtained in step 116.

FIG. 2 shows a dark spot 58 and a crack 60 on surface 52, both of which are presumed to produce a darker gray scale level of 150. Spot 58 is represented in FIG. 3 by the pixel located at col. 3, row 3. Crack 60 is represented in FIG. 3 by the pixels at col. 1, row 7; col. 2, row 8; and col. 3, row 9. Also, dark spot 61 coincides with edge 53. Edge 53 is represented on FIG. 3 by column 52, and spot 61 is represented by the gray level value of 75 at row 5 of that column. It should be readily apparent that the width of crack 60 and the diameter of the spots likely covers many pixels, not just one. Moreover, even if the spot 58, for example, is so small that it corresponds in size to only one pixel and by coincidence the pixel is in perfect registration with it, the gray levels of the surrounding pixels may nevertheless also be affected by the spot to have a gray level below 200 if the resolution of the microscope optics results in a blur circle larger than the pixel size. It should be realized that the array 55 of pixels 56 in FIG. 3 has been presented for illustrative purposes in order to simplify the task of explaining the invention, and does not necessarily depict such gray levels accurately.

Figure 4:
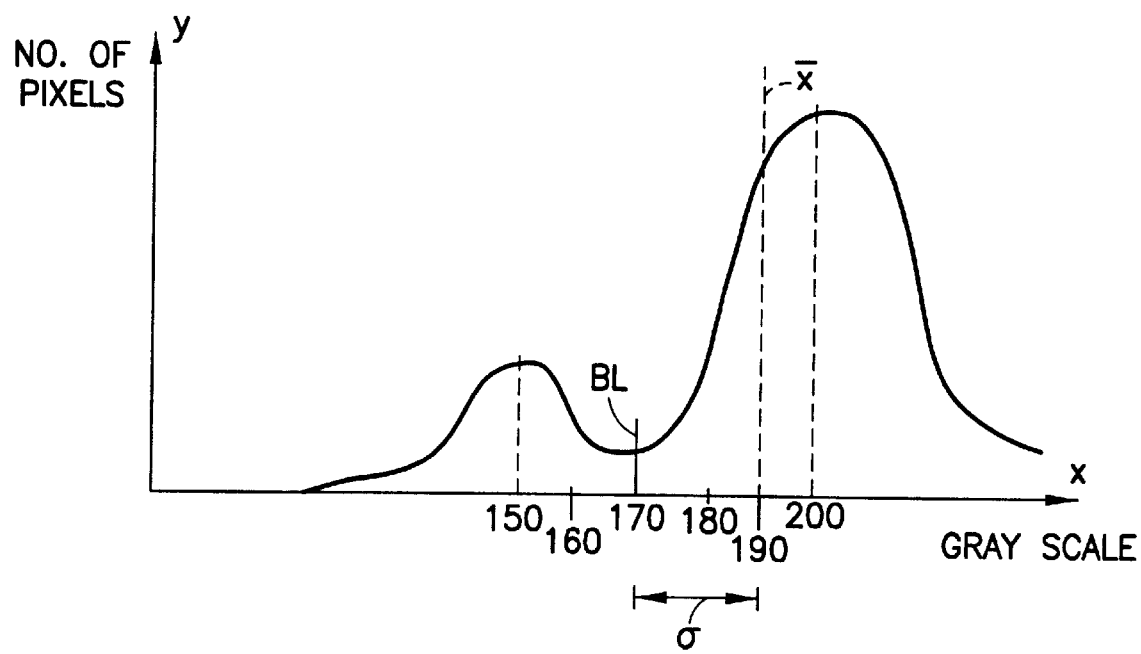
FIG. 4 is a histogram of the pixel gray levels for one column of the table of FIG. 3.

The invention will now proceed to process the digitized image data of array 55 in order to reduce the noise created by spots, cracks and other artifacts in surface 52. This processing can be implemented by an improvement of image processor 28 or carried out by computer 30, for example. The processing determines the mean value $\overline{X}$ and the standard deviation $\alpha$ for each column of array 55. Various well known computational methods can be used. One approach will now be described in connection with FIG. 4. FIG. 4 is a graph of a histogram which is derived from the values in one column of FIG. 3. If a range of 256 gray levels is selected for use, then gray levels 0–255 are along the x-axis and the number of pixels for each gray level is along the y-axis. As will be explained in more detail below, such a graph is derived for each and every column of the pixel array 55. FIG. 4 has been derived from column 1 of FIG. 3. Preferably, the processing proceeds sequentially, column-to-column, starting at one side of the array, proceeding in a direction toward the edge of interest, and then on through to the other side of the array. Thus, in the case of edge 53 as shown in FIG. 2, the analysis begins at the left-most column (i.e., column 1) of array 55 and proceeds on through to column n.

As is readily apparent from FIG. 4, the graph has a primary peak at the gray level of 200 and a secondary peak at the gray level of 150. The secondary peak constitutes noise caused by the cracks and spots which distorts the gray levels corresponding to surfaces 50 and 52 and, therefore, affects the derived image and the accuracy with which the position of edge 53 can be detected.

In accordance with the present invention, the mean value $\overline{X}$ and the standard deviation $\sigma$ are calculated in a well known way, details of which are not deemed necessary to provide. A range of acceptable data having a boundary limit BL on either side of the mean value $\overline{X}$ is then selected in accordance with step 122. A general equation to express how BL is derived is: $BL=\overline{X}\pm a\sigma$, where "a" is a constant selected by the operator when the apparatus is calibrated. The selection of "a" is made per step 118 based on various factors which in the operator's judgment and experience affect the accuracy of the result. For example, if the edge is strongly distinctive and the noise is weak, the "a" selected may be different than if the edge is not very distinctive and the noise is strong. Likewise, for some conditions the "a" may be different for those pixels which are on one side of the mean value $\overline{X}$ than for those pixels which are on the other side. Also, a BL on only one side of the mean value $\overline{X}$ can be used. Some trial and error may be relied upon by the operator in making these choices.

In the example shown in FIG. 4, the operator will set "a" so that BL falls at the root of the histogram or the root can be located automatically by well known computational methods. For example, if the mean value $\overline{X}$ for column 1 happens to be 190 the standard deviation $\sigma$ happens to be 10 and the root is at 170, then "a" is set at 2 in step 118. The range is defined by step 122 to be between a lower boundary limit BL of 170 and an upper boundary limit of 210. Of course, these values are merely illustrative, and it should be understood that the shape of the primary and secondary peaks, together with the values of $\overline{X}$ and $\sigma$, and the position of the boundary limits relative to such peaks can vary. However, such variations are still handled in accordance with the present invention, further details of which will now be provided.

A detailed description of how the data in array 55 is processed will be provided only with respect to gray levels below the lower BL (i.e. 170) which, hereinafter, will be referred to simply as BL. It should be understood that gray levels above the upper BL (i.e. 210) can be processed in an analogous manner.

In accordance with one approach of the present invention (step 124), every gray level in column 1 which falls below 170 is replaced by the gray level of the BL (i.e., values below 170 are replaced by 170). In accordance with another approach of the invention (also represented by step 124, gray levels below BL are replaced with the gray level $\overline{X}$ of the mean, i.e., by 190. Whether one or another of these approaches is picked depends upon which is found by the operator to yield the better result under the particular circumstances involved. For whichever approach is used, the invention processes column 1 of array 55 and makes the necessary replacements of gray levels.

In accordance with yet another approach of the present invention (step 126 which is shown to be an alternative by use of dotted lines), those gray levels below BL represent invalid data. The invalid data is rejected from further image processing by removing each pixel involved and its gray level. Thus, if a column has m pixels in it, and two of such m pixels have gray levels below 170, then further processing of the column data considers the column to have only m−2 pixels, and the gray scale levels of those two pixels are ignored. Further, processing is then carried out with this data, as explained below. This approach does not reduce the visible artifacts, but it does provide data cleared of invalid information, which data can be usefully relied on for certain purposes. Also, this approach is faster to process because it does not require gray level replacement.

A variation of this last approach is to use the m−2 (as used in the example above) pixels for recalculating the mean value $\overline{X}$, and then to use such recalculated value for replacing the gray level in the two rejected pixels. Those pixels, with the replaced gray level, can then be used to provide an image.

Per steps 120, 128 and 130, the above-described steps begin with column 1 and are repeated for each and every one of the n columns of pixel array 55. As a result, the influence of noise in the digitized image data of array 55 will have been reduced so that a sharp and clear discontinuity should be discernible in the rows which accurately depicts the position of the edge as the pixel location(s) where the gray level drops from the vicinity of 200 to the vicinity of 100.

If the length of an edge is divided into several areas of interest in order to, for example, keep the amount of data to a manageable amount, then the above-described processing is performed until the digitized data in all such portions has been processed. Conversely, several areas of interest can be processed together.

Once the gray levels for the pixels in column 1 have been set in accordance with any one of the above-described approaches, an average gray level for all or part of column 1 is calculated from the sum of the gray scale values divided by the number of pixels. Whether all or part of a column is used depends on the particular circumstances, such as the nature of the feature, the amount of data in the column. This averaging is repeated for all of the columns to derive an averaged row which has a discontinuity corresponding to the location of the edge. Step 132 represents this averaging operation as well as other edge detection operations. The edge detected in this way will represent the edge position for the entire region of interest, or portion thereof, which was used to process the data from which the edge is detected. Details of how the edge is located with the above-described processed digitized image data are not provided because they do not form a part of the invention and are deemed to be within the knowledge of one with ordinary skill in the art. Chapter 7 of the above-mentioned *Digital Image Processing* book has a section on edge detection which is hereby incorporated by reference. As explained above, the invention is directed toward reducing the effect of noise in the digitized image data obtained with the imaging device (which can be a microscope, telescope, etc.).

Figure 5:
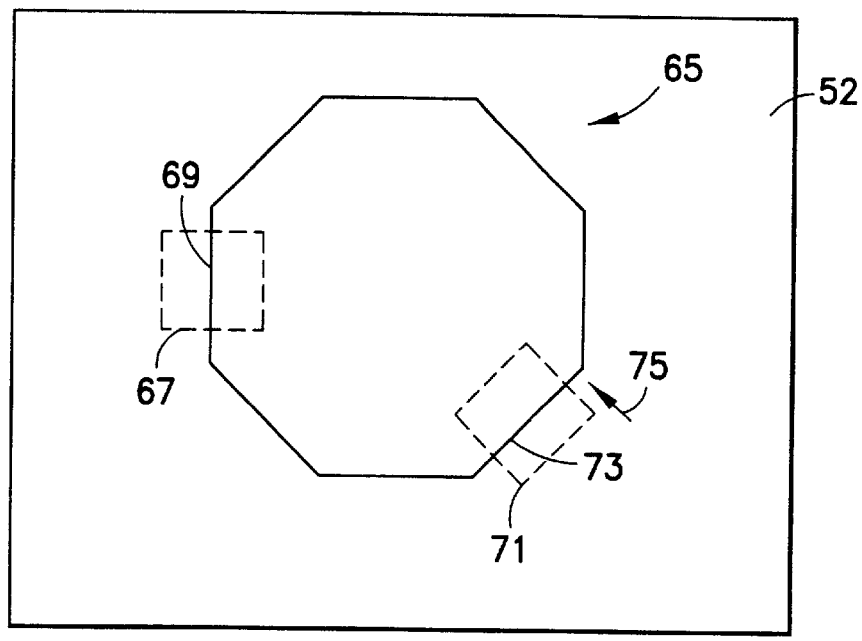
FIG. 5 is a schematic representation of a multiple-sided feature shaped differently from the one shown in FIG. 2.

FIG. 2 shows a rectangular-shaped feature of the object, the width of which is being measured and having both of its sides 53 and 53a in parallel. However, the present invention is applicable to any multi-sided geometric shape. The key to using the present invention is to set up region of interest 54 such that its columns of pixels 56 are parallel to the edge of immediate interest. For example, FIG. 5 shows an octagon 65 on surface 52. Region of interest 67 is set up to locate edge 69 by conducting the processing of pixel columns from left to right, in the same way as described above with respect to FIGS. 2 and 3. Likewise, region of interest 71 is set up to locate edge 73 by conducting the processing of pixel columns in the direction of arrow 75. The definition of "column" in this sense is not just a vertical sequence of pixels but, rather, a set of pixels in a straight line all of which are spaced an integral number of pixels from edge 73. Thus, if region of interest 71 is sized to begin the analysis at a column ten pixels away from edge 73, then "column" 1 to be analyzed will include all the pixels in the m rows of region of interest 71 which are 10 pixels from edge 73.

The spacing of the columns described above is one pixel. However, it is also possible to use sub-pixel and multiple pixel column spacing. Thus, if a spacing of one-half pixel is used, then the narrower spacing results in pixels with more similar gray levels in each column. A spacing of 2 pixels can also be used, and such wider spacing results in a faster processing time.

Figure 6:
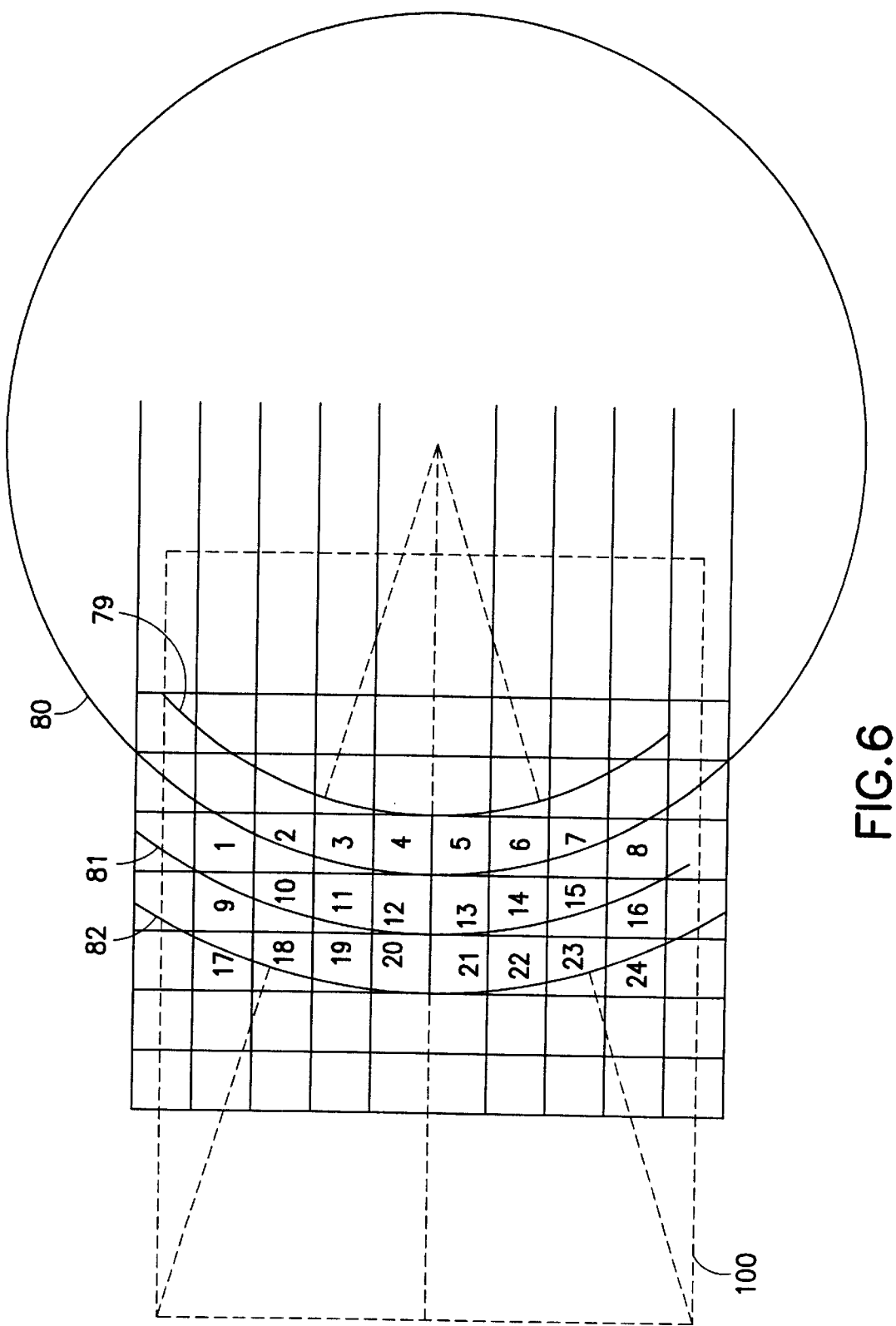
FIG. 6 is a schematic representation of a circular-shaped feature.

Not only can the present invention be applied to multi-sided geometrical shapes of a feature, it can also be applied to curved edges. For example, FIG. 6 shows a circle 80 representing a circular feature and portions of concentric circles 79, 81 and 82 having respective radii which are one pixel apart (for reasons explained below).

The steps of FIG. 7 can be applied to circle 80. In particular, a rectangular region of interest 100 is defined. As explained before, a suitably sized region of interest 100 is selected by the operator. A "column" is then selected to have a width based on a pre-defined spacing from the circle. The spacing could be the size (e.g. width) of a pixel, for example. For purposes of this explanation, let us call the column closest to circle 80 column 1, the next one column 2, and so on. Each of the pixels is also numbered.

The operator of a machine can pick the criteria in accordance with which to associate any given pixel with a particular column, or this can be otherwise preset. Examples of such criteria are whether any part of the pixel falls in a column, whether most of a pixel falls in a column, whether more than a fixed fraction falls in a column, or whether all of a pixel falls in a column. For purposes of illustration, the following Tables A and B have been prepared based on the first and second above-mentioned criteria, respectively.

TABLE A

| Col. 1 | Col. 2 |
|---|---|
| 1 | 9 |
| 2 | 10 |
| 3 | 11 |
| 5 | 13 |
| 6 | 14 |
| 7 | 15 |
| 8 | 16 |
| 9 | 17 |
| 10 | 18 |
| 11 | 19 |
| 12 | 20 |
| 13 | 21 |
| 14 | 22 |
| 15 | 23 |
| 16 | 24 |

TABLE B

| Col. 1 | Col. 2 |
|---|---|
| 1 | 9 |
| 2 | 15 |
| 7 | 16 |
| 8 | 18 |
| 10 | 19 |
| 11 | 20 |
| 12 | 21 |
| 13 | 22 |
| 14 | 23 |

Table A provides more data per column, but with some overlap since some pixels are used in more than one column. Table B provides less data per column, but with little or no overlap. Whether one option or another is selected depends on what the operator regards as producing superior results.

The spacing from circle 80 to define the columns need not be based on the dimensions of one pixel. The spacing can be on a sub-pixel level or on a multiple-pixel level. The above-described "column" approach used in FIG. 6 is also applicable to any shaped curve. The boundary of each column follows the shape of the curve at a specified multiple of the selected spacing from the curve. The analysis of pixels and their gray levels within such region of interest proceeds in the same way as described above in connection with FIGS. 2 and 3.

Although preferred embodiments of the present invention have been described in detail above, various modifications thereto will be readily apparent to anyone with ordinary skill in the art. For example, the feature can be imaged with any imaging device having an output which can be digitized to produce a plurality of gray levels, such as particle beam (e.g. SEM), optical system (e.g. microscope), scanned probe (e.g. STM, AFM), telescope, camera (e.g. satellite), MRI and so on. Furthermore, it is not necessary to have a separate unit for the image processor 28 and computer 30. These can be combined. Also, processor 28 or any other computational device can handle the processing. It must also be noted that although gradations in the digitized image are described above as being represented by gray levels, this is not the only usable imaging parameter. An imaging parameter, of which gray level is but one example, can also be a Z-dimension output signal produced by any type of scan probe microscope, by way of another example. The type of imaging parameter used depends at least in part on the imaging device selected for the machine. These and all other such variations are intended to fall within the scope of the present invention as defined by the following claims.

I claim:

1. A method for measuring a physical feature of an object by accurately determining a position of an edge of the feature in a digitized image of at least a portion of the object, comprising:

locating an approximate position of the edge;

providing digitized image data corresponding to a selected area of the object which encompasses said approximate position of the edge and having respective values of an imaging parameter for pixels within said area;

deriving an array of m×n imaging parameter values corresponding to pixels arranged in a plurality of columns n each of which is spaced from said approximate position of the edge by a specified distance;

setting a range of acceptable values of said imaging parameter;

replacing all values of said imaging parameter in said array that are outside said range with a designated value to obtain a revised array of imaging parameter values; and accurately determining said position of the edge from said imaging parameter values in the revised array;

wherein setting a range of acceptable values of said imaging parameter comprises:
   for each of columns n, deriving a distribution of the number of pixels vs. imaging parameter values; and based on the distribution, setting said range of acceptable values of the imaging parameter.

2. The method of claim 1, wherein said columns n are respectively spaced from the approximate position of the edge by an integral number of pixels.

3. The method of claim 1, wherein said columns n are respectively spaced from the approximate position of the edge by an integral number of sub-pixels.

4. The method of claim 1, wherein said columns n are respectively spaced from the approximate position of the edge by an integral number of multi-pixels.

5. The method of claim 1, wherein the imaging parameter is gray level.

6. The method of claim 5, wherein the replacing step comprises replacing the gray levels that are outside said range with a designated gray level.

7. The method of claim 6, further comprising the step of deriving a mean value of the gray levels in a column, and wherein said designated gray level is said mean value.

8. The method of claim 6, wherein said designated gray level is the gray level at a boundary of said range.

9. The method of claim 8, wherein said range setting step comprises:
   determining a mean value;
   determining a standard deviation; and
   setting a boundary of said range at a difference from said mean value related to said standard deviation.

10. The method of claim 1, wherein said step of replacing imaging parameter values to obtain a revised array comprises deleting imaging parameter values that are outside of said range from said digitized image data.

11. The method of claim 1, wherein said edge detecting step comprises identifying discontinuities in values of the imaging parameter between adjacent columns of the revised array.

12. The method of claim 1, wherein said edge is linear and said columns are correspondingly linear.

13. The method of claim 1, wherein the approximate position of said edge is arcuate, and said columns are correspondingly arcuate.

14. A method for measuring a physical feature of an object by accurately determining a position of an edge of the feature in a digitized image of at least a portion of the object, comprising:
   locating an approximate position of the edge;
   providing digitized image data corresponding to a selected area of the object which encompasses said approximate position of the edge and having respective values of an imaging parameter for pixels within said area;
   deriving an array of m×n imaging parameter values corresponding to pixels arranged in a plurality of columns n each of which is spaced from said approximate position of the edge by a specified distance;
   setting a range of acceptable values of said imaging parameter;
   replacing all values of said imaging parameter in said array that are outside said range with a designated value to obtain a revised array of imaging parameter values; and
   accurately determining said position of the edge from said imaging parameter values in the revised array;
   wherein said step of setting a range of acceptable values comprises deriving a first mean value of the imaging parameter based on all values in a column, and wherein said replacing step comprises deriving a second mean value based only on values within said range and replacing the values outside said range with said second mean value.

15. Apparatus for measuring a physical feature of an object by accurately determining a position of an edge of the feature in a digitized image of at least a portion of the object, comprising:
   means for locating an approximate position of the edge;
   means for providing digitized image data corresponding to a selected area of the object which encompasses said approximate position of the edge and having respective values of an imaging parameter for pixels within said area;
   means for deriving an array of m×n imaging parameter values corresponding to pixels arranged in a plurality of columns n each of which is spaced from said approximate position of the edge by a specified distance;
   means for setting a range of acceptable values of said imaging parameter;
   means for replacing all values of said imaging parameter in said array that are outside said range with a designated value to obtain a revised array of imaging parameter values; and
   means for accurately determining said position of the edge from said imaging parameter values in the revised array;
   wherein said means for setting a range of acceptable values of said imaging parameter comprises:
      means for deriving, for each of columns n, a distribution of the number of pixels vs. imaging parameter values; and
      means for setting, based on the distribution, said range of acceptable values of the imaging parameter.

16. The apparatus of claim 15, wherein said columns n are respectively spaced from the approximate position of the edge by an integral number of pixels.

17. The apparatus of claim 15, wherein said columns n are respectively spaced from the approximate position of the edge by an integral number of sub-pixels.

18. The apparatus of claim 15, wherein said columns n are respectively spaced from the approximate position of the edge by an integral number of multi-pixels.

19. The apparatus of claim 15, wherein the imaging parameter is gray level.

20. The apparatus of claim 19, wherein the means for replacing comprises means for replacing the gray levels that are outside said range with a designated gray level.

21. The apparatus of claim 20, further comprising means for deriving a mean value of the gray levels in a column, and wherein said designated gray level is said mean value.

22. The apparatus of claim 20, wherein said designated gray level is the gray level at a boundary of said range.

23. The apparatus of claim 15, wherein said range setting means comprises:
   means for determining a mean value;

means for determining a standard deviation; and means for setting a boundary of said range at a difference from said mean value related to said standard deviation.

24. The apparatus of claim 15, wherein said means for replacing imaging parameter values to obtain a revised array comprises means for deleting imaging parameter values that are outside of said range from said digitized image data.

25. The apparatus of claim 15, wherein said means for setting a range of acceptable values comprises means for deriving a first mean value of the imaging parameter based on all values in a column, and wherein said replacing means comprises means for deriving a second mean value based only on values within said range and replacing the values outside said range with said second mean value.

26. The apparatus of claim 15, wherein said edge detecting means comprises means for identifying discontinuities in values of the imaging parameter between adjacent columns of the revised array.

27. The apparatus of claim 15, wherein said edge is linear and said columns are correspondingly linear.

28. The apparatus of claim 15, wherein the approximate position of said edge is arcuate, and said columns are correspondingly arcuate.

* * * * *